(12) United States Patent
Bray et al.

(10) Patent No.: US 10,604,197 B2
(45) Date of Patent: Mar. 31, 2020

(54) DOWNFORCE FEEDBACK SYSTEMS AND CONTROL LOGIC FOR ACTIVE AERODYNAMIC DEVICES OF MOTOR VEHICLES

(71) Applicant: GM Global Technology Operations LLC, Detroit, MI (US)

(72) Inventors: Samantha J. Bray, Northville, MI (US); Timothy D. Demetrio, Highland, MI (US); Philip C. Lundberg, Keego Harbor, MI (US); Joshua R. Auden, Brighton, MI (US); Jason D. Fahland, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 355 days.

(21) Appl. No.: 15/714,072

(22) Filed: Sep. 25, 2017

(65) Prior Publication Data

US 2019/0092403 A1 Mar. 28, 2019

(51) Int. Cl.

| | |
|---|---|
| *B60R 22/00* | (2006.01) |
| *E05F 15/00* | (2015.01) |
| *G05D 1/00* | (2006.01) |
| *G05D 3/00* | (2006.01) |
| *G06F 7/00* | (2006.01) |
| *G06F 17/00* | (2019.01) |
| *B62D 37/02* | (2006.01) |
| *B62D 35/00* | (2006.01) |
| *G05B 15/02* | (2006.01) |
| *F15D 1/10* | (2006.01) |
| *G05D 7/01* | (2006.01) |

(52) U.S. Cl.
CPC ............ *B62D 37/02* (2013.01); *B62D 35/007* (2013.01); *F15D 1/10* (2013.01); *G05B 15/02* (2013.01); *B60Y 2400/4187* (2013.01); *G05D 7/0193* (2013.01)

(58) Field of Classification Search
CPC ......... B62D 37/02; B62D 35/007; F15D 1/10; G05B 15/02; G06F 19/00
USPC .......................................................... 701/49
See application file for complete search history.

(56) References Cited

U.S. PATENT DOCUMENTS

| | | |
|---|---|---|
| 4,867,397 A | 9/1989 | Pamadi et al. |
| 5,280,990 A | 1/1994 | Rinard |
| | (Continued) | |

*Primary Examiner* — Mahmoud S Ismail
(74) *Attorney, Agent, or Firm* — Quinn IP Law

(57) ABSTRACT

Disclosed are downforce feedback systems for active aerodynamic devices, methods for making/using such systems, and vehicles equipped with a closed-loop downforce feedback system to govern operation of the vehicle's active aero device(s). A feedback control system for operating an active aerodynamic device of a motor vehicle includes one or more pressure sensors for detecting fluid pressures in one or more pneumatic or hydraulic actuators for moving the active aero device. A vehicle controller receives fluid pressure signals from these sensor(s), and calculates an actual downforce value from these signal(s). The controller retrieves a calibrated downforce value from mapped vehicle downforce data stored in memory, and determines if the actual downforce value differs from the calibrated value. If so, the controller determines a target position for a target downforce value for a current vehicle operating condition, and commands the actuator(s) to move the active aero device to the target position.

20 Claims, 2 Drawing Sheets

(56) References Cited

U.S. PATENT DOCUMENTS

| | | |
|---|---|---|
| 5,360,252 A | 11/1994 | Larsen |
| 5,908,217 A | 6/1999 | Englar |
| 6,283,407 B1 | 9/2001 | Hakenesch |
| 7,192,077 B1 | 3/2007 | Hilleman |
| 7,255,387 B2 | 8/2007 | Wood |
| 7,431,381 B2 | 10/2008 | Wood |
| 8,196,994 B2 | 6/2012 | Chen |
| 9,132,904 B2 | 9/2015 | Durham |
| 9,333,994 B1 | 5/2016 | Fahland |
| 2009/0026797 A1 | 1/2009 | Wood |
| 2010/0181799 A1 | 7/2010 | Ryan et al. |
| 2011/0035119 A1* | 2/2011 | Sandgren ............ B62D 35/001 701/49 |
| 2011/0068604 A1 | 3/2011 | Neuberger et al. |
| 2011/0095564 A1 | 4/2011 | Chen |
| 2011/0095566 A1 | 4/2011 | Chen |
| 2011/0148140 A1 | 6/2011 | Benton |
| 2011/0175395 A1 | 7/2011 | Guigne et al. |
| 2013/0062908 A1 | 3/2013 | Henderson et al. |
| 2017/0088106 A1 | 3/2017 | Fahland et al. |
| 2017/0088194 A1 | 3/2017 | Heil |
| 2017/0088200 A1 | 3/2017 | Heil et al. |
| 2017/0088201 A1 | 3/2017 | Heil et al. |
| 2017/0151984 A1 | 6/2017 | Bray et al. |
| 2017/0158257 A1 | 6/2017 | Fahland et al. |
| 2017/0158259 A1 | 6/2017 | Fahland et al. |
| 2019/0063474 A1* | 2/2019 | Brinkman ............ F15B 19/005 |

\* cited by examiner

DOWNFORCE FEEDBACK SYSTEMS AND CONTROL LOGIC FOR ACTIVE AERODYNAMIC DEVICES OF MOTOR VEHICLES

INTRODUCTION

The present disclosure relates generally to features for improving the aerodynamic performance of motor vehicles. More specifically, aspects of this disclosure relate to downforce feedback systems and control logic for operating active aerodynamic devices to dynamically modify the aerodynamic characteristics of motor vehicles.

Many current production motor vehicles, such as the modern-day automobile, are originally equipped or retrofit with stock body hardware or aftermarket accessories engineered to improve the aerodynamic performance of the vehicle. Front air dams and splitters, for example, modify the flow of air passing under the vehicle body to balance the distribution of fore and aft downforce. As the name implies, an air dam is a fluid barrier structure; in this case, one that is mounted underneath or integrated with the front bumper structure of the vehicle body, extending downward into proximity with the roadway. Air dams—or more colloquially "front spoilers"—enhance vehicle stability and aerodynamics by blocking and redirecting turbulent air flowing under the chassis. Splitters, on the other hand, are constructed as a flat extension to the very bottom of the front bumper, extending forward from the vehicle and parallel to the ground. A splitter acts like a wedge that forces high pressure air upwards and over the vehicle, and forces high speed, low pressure air underneath the car, resulting in a net positive downforce.

While splitters and air dams are designed to modify the aerodynamic characteristics of the front end of a vehicle, spoilers and diffusers operate to modify aerodynamic flow at the rear end of a vehicle. An air spoiler is normally anchored on top of the trunk lid or rear roof rail, and is shaped similar in geometry to an inverted airfoil to modify airflow and generate an aerodynamic pressure gradient that produces downforce on the rear tires. A rear diffuser, on the other hand, is a series of specially formed channels on the aft part of the vehicle underbody that improves aerodynamic properties by ameliorating the transition between high-velocity airflow along the undercarriage and the much slower freestream airflow of surrounding ambient air. Generally speaking, a rear diffuser helps underbody airflow to decelerate and expand by providing pressure recovery so that it does not cause excessive flow separation and drag.

For some high-performance automotive applications, the vehicle is stock equipped with an active aerodynamic element that can be reoriented or repositioned while the automobile is in motion to adjust the aerodynamic properties of the vehicle. One such "active aero" device is the deployable rear spoiler that can be dynamically retracted and extended based on vehicle operating conditions. At lower vehicle speeds, for instance, the spoiler is retracted to a stowed position, seated generally flush against the rear of the vehicle, to reduce fluid drag forces. When the vehicle reaches higher speeds—around 50 to 60 mph—the spoiler is automatically deployed to an extended position, displaced away or projecting angularly from the rear of the vehicle, to reduce the effects of turbulent air flow and to generate downforce for improved vehicle stability and handling. Another available active aero device is the rotatable rear wing which has a dynamically adjustable pitch angle to control drag and downforce at various speeds and, for some architectures, provide air-braking capabilities.

SUMMARY

Disclosed herein are downforce feedback systems and related control logic for active aerodynamic devices of motor vehicles, methods for making and methods for using such downforce feedback systems, and motor vehicles equipped with a downforce feedback system that helps to govern operation of the vehicle's active aero device(s). By way of example, there is presented a closed-loop control architecture designed to monitor aerodynamic forces applied to an active aero element through feedback from sensed internal pressure changes in a vehicle fluid system. Pressure sensors in a hydraulic or pneumatic actuator system of a deployable rear spoiler or repositionable front air dam, for example, systematically track supply-side fluid pressure changes caused by ambient conditions. From these incidental pressure changes, the system interpolates actual downforce magnitudes on the active aero element. These values are then compared to calibrated vehicle data to assess if target downforce values are not being achieved and, if not, to modulate the positioning of the active aero element to achieve target values. Using these comparisons, the system determines if the active aero element is damaged or not functioning properly and, thus, requires maintenance. Actual downforce values may also be used to assess if aerodynamic forces have been altered by external influencers.

Attendant benefits for at least some of the disclosed concepts include downforce monitoring systems that provide improved control of active aerodynamic devices through closed-loop feedback with a governing vehicle controller. Disclosed active aero feedback architectures also help to eliminate costs associated with implementing dedicated downforce sensors and attendant sensor calibration strategies, while retaining the performance and reliability advantages of directly measuring downforce. Active aero feedback systems presented herein also help to improve vehicle awareness through increased accuracy of downforce estimates. Improving downforce detection on the vehicle helps to improve the accuracy of commanded downforce implemented by the active aero device, thereby further optimizing vehicle aerodynamic performance which helps to improve vehicle stability, reduce wind-borne noise, and minimize drag. Other attendant benefits include reduced part and manufacturing costs, decreased warranty issues, and vehicle mass reduction.

Aspects of the present disclosure are directed to closed-loop downforce feedback architectures and related control logic for governing operation of active aero devices. Disclosed, for example, is an electronic feedback control system for operating an active aerodynamic device of a motor vehicle. The motor vehicle includes a vehicle body movably mounting thereon the active aerodynamic device, and one or more fluid-driven—pneumatically activated or hydraulically activated—actuators selectively operable to move the active aerodynamic device. The feedback control system includes one or more pressure transducers, piezometers, manometers or other pressure sensitive devices (collectively "pressure sensor") that mount to the vehicle body and operatively connect to the fluid-driven actuator(s). Each pressure sensor is operable to detect fluid pressures in at least one actuator and generate fluid pressure signals indicative thereof. A memory device, which may be resident to or remote from the vehicle body, stores mapped vehicle downforce data calibrated to the motor vehicle.

The feedback control system also includes a vehicle controller that is communicatively connected to the memory device, each pressure sensor, and each actuator. The vehicle controller is programmed to receive a fluid pressure signal from each pressure sensor, and calculate an actual downforce value on the active aero device from the received signal or signals. The controller then determines if the calculated actual downforce value differs from a calibrated downforce value that is retrieved from the mapped vehicle downforce data stored in the memory device. If there is a detectable difference, e.g., and this difference exceeds a calibrated minimum discrepancy, the vehicle controller responsively determines a target position or state corresponding to a target downforce value for a current operating condition of the vehicle, and transmits a command signal to the pneumatic/hydraulic actuator(s) to move the active aerodynamic device to the target position/state.

Other aspects of the present disclosure are directed to motor vehicles equipped with closed-loop downforce feedback active aero architectures. As used herein, the term "motor vehicle" may include any relevant vehicle platform, such as passenger vehicles (combustion engine, hybrid electric, full electric, fuel cell, fuel cell hybrid, fully or partially autonomous, etc.), commercial vehicles, industrial vehicles, tracked vehicles, off-road and all-terrain vehicles (ATV), farm equipment, boats, airplanes, etc. A motor vehicle is presented that includes a vehicle body with a passenger compartment, multiple road wheels, and at least one active aerodynamic device mounted proximate a front end or a rear end of the vehicle body (e.g., to a trunk lid, engine hood, tailgate, liftgate, front or rear bumper assembly, etc.). One or more pneumatic or hydraulic actuators are mounted to the vehicle body, and selectively operable to regulate movement of the active aero device/devices.

Continuing with the above example, the motor vehicle is equipped with one or more pressure sensors that are mounted to the vehicle body and fluidly connected to the actuator(s). Each pressure sensor is operable to detect fluid pressures in at least one of the actuators and generate fluid pressure signals indicative thereof. A main or auxiliary or remote memory device stores mapped vehicle downforce data calibrated to the motor vehicle. A vehicle controller, such as a programmable onboard electronic control unit, communicates with the memory device, each sensor, and each active aero actuator. The vehicle controller is programmed to: receive a fluid pressure signal from a pressure sensor; calculate an actual downforce value from the received fluid pressure signal(s); determine if the calculated actual downforce value differs from a calibrated downforce value retrieved from the mapped vehicle downforce data stored in the memory device; responsive to the actual downforce value differing from the calibrated downforce value, determine a target position for a target downforce value for a current vehicle operating condition; and, transmit a command signal to the actuator(s) to move the active aerodynamic device to the target position.

Additional aspects of the present disclosure are directed to methods for making and methods for using closed-loop downforce feedback architectures for active aero devices. Presented, for example, is a method for operating an active aerodynamic device of a motor vehicle. The representative method includes, in any order and in any combination with any of the disclosed features and options: detecting, via a pressure sensor mounted to the vehicle body and fluidly connected to a pneumatic or hydraulic actuator, a fluid pressure in the pneumatic or hydraulic actuator; receiving, from the pressure sensor via a vehicle controller communicatively connected thereto, a fluid pressure signal indicative of the detected fluid pressure; calculating, via the vehicle controller, an actual downforce value from the received fluid pressure signal; retrieving, from a memory device via the vehicle controller, a calibrated downforce value stored in mapped vehicle downforce data calibrated to the motor vehicle; determining, via the vehicle controller, if the calculated actual downforce value differs from the retrieved calibrated downforce value; responsive to a determination that the actual downforce value differs from the calibrated downforce value, determining a target position corresponding to a target downforce value for a current operating condition of the vehicle; and, transmitting a command signal to the pneumatic or hydraulic actuator to move the active aerodynamic device to the target position.

The above summary is not intended to represent every embodiment or every aspect of the present disclosure. Rather, the foregoing summary merely provides an exemplification of some of the novel concepts and features set forth herein. The above features and advantages, and other features and advantages of the present disclosure, will be readily apparent from the following detailed description of illustrative embodiments and representative modes for carrying out the present disclosure when taken in connection with the accompanying drawings and the appended claims. Moreover, this disclosure expressly includes any and all combinations and subcombinations of the elements and features presented above and below.

Figure 1:
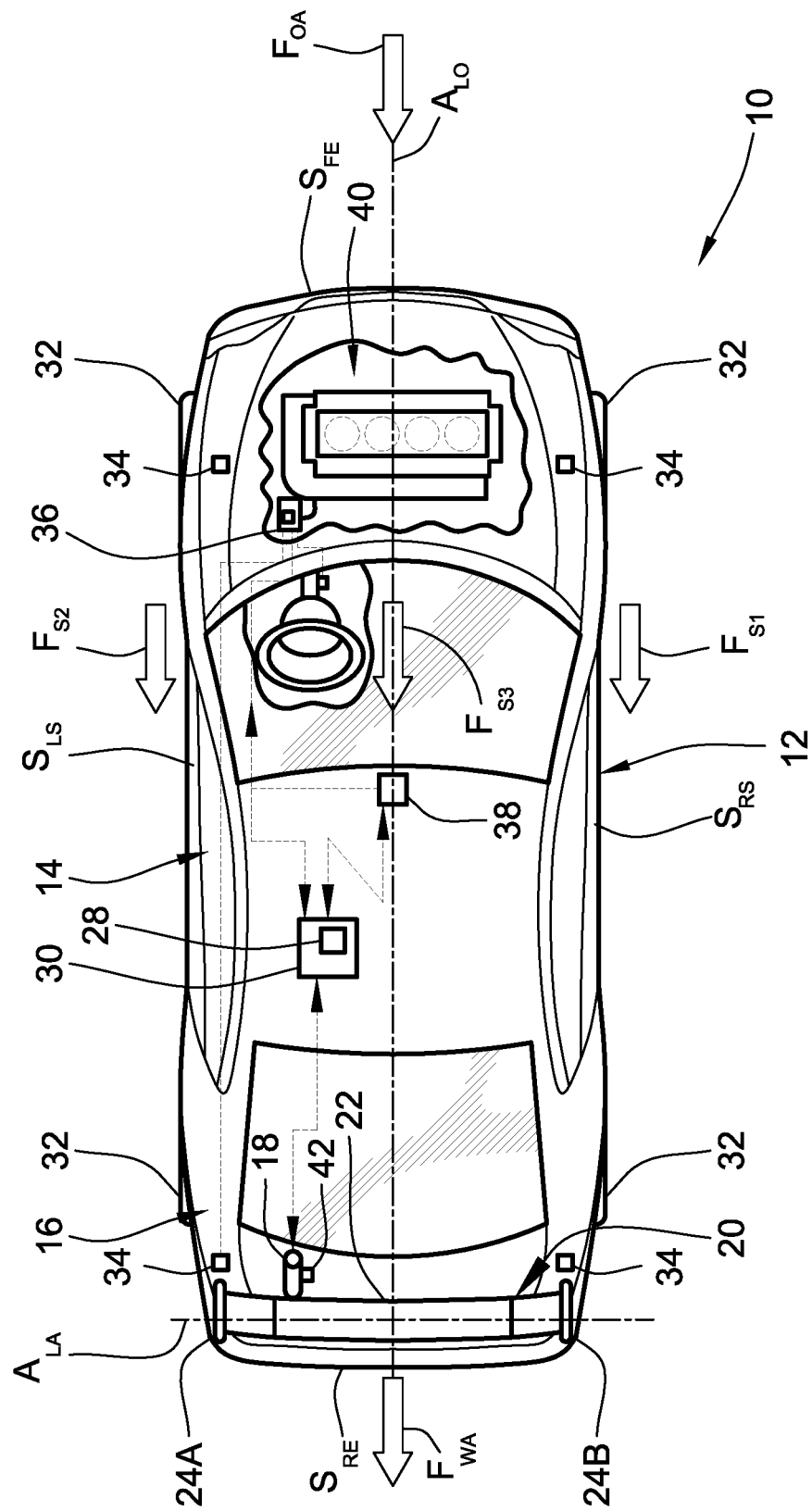
FIG. 1 is a partially schematic plan-view illustration of a representative motor vehicle equipped with an example of an active aerodynamic device governed by a closed-loop downforce feedback system in accordance with aspects of the present disclosure.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope of this disclosure as defined by the appended claims.

DETAILED DESCRIPTION

This disclosure is susceptible of embodiment in many different forms. There are shown in the drawings and will herein be described in detail representative embodiments of the disclosure with the understanding that these illustrated examples are provided as an exemplification of the disclosed principles, not limitations of the broad aspects of the disclosure. To that extent, elements and limitations that are described, for example, in the Abstract, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, etc., are with respect to a motor vehicle, such as a forward driving direction of a motor vehicle when the vehicle is operatively oriented on a normal driving surface, for example.

Referring now to the drawings, wherein like reference numbers refer to like features throughout the several views, there is shown in FIG. 1 a partially schematic illustration of a representative automobile, which is designated generally at 10 and portrayed herein for purposes of discussion as a two-seat coupe-style passenger vehicle. Mounted to the body 12 of the automobile 10, e.g., aft of a passenger compartment 14 and above a rear cargo compartment 16 (also referred to herein as "trunk"), is an actively controlled ("active") aerodynamic device 20 for improving aerodynamic performance of the vehicle 10. The illustrated automobile 10—also referred to herein as "motor vehicle" or "vehicle" for short—is merely an exemplary application with which novel aspects and features of this disclosure may be practiced. In the same vein, implementation of the present concepts into a rear pedestal-type, rotatable spoiler assembly should also be appreciated as a representative application of the novel features disclosed herein. As such, it will be understood that aspects and features of this disclosure may be applied to other active aero device configurations, may be incorporated into other aerodynamic aero system layouts, and may be implemented for any logically relevant type of motor vehicle. Lastly, the drawings presented herein are not necessarily to scale and are provided purely for instructional purposes. Thus, the specific and relative dimensions shown in the drawings are not to be construed as limiting.

As shown in FIG. 1, the vehicle body 12 defines four body sides: a body front side or front end $S_{FE}$, a body rear side or rear end $S_{RE}$ opposite the front end $S_{FE}$, a lateral port side or left side $S_{LS}$, and a lateral starboard side or right side $S_{RS}$ opposite the left side $S_{LS}$. The left (port) side $S_{LS}$ and right (starboard) side $S_{RS}$ are generally parallel to one another and with respect to a longitudinal axis $A_{LO}$ of the vehicle 10, and span the distance between the vehicle's front and rear ends $S_{FE}$, $S_{RE}$. During normal vehicle operation, the front end $S_{FE}$ is oriented to face oncoming ambient airflow $F_{OA}$ when the vehicle 10 is in forward motion relative to the road surface. As the vehicle 10 moves across the road surface, the ambient airflow $F_{OA}$ passes around the vehicle body 12 and splits into various airflow portions, represented in FIG. 1 with first airflow portion $F_{S1}$ passing around the starboard side $S_{RS}$ of the vehicle 10, second airflow portion $F_{S2}$ passing around the vehicle's port side $S_{LS}$, and third airflow portion $F_{S3}$ passing over the top of the vehicle 10. A fourth airflow portion (not visible in the view provided) passes underneath the vehicle 10 along the undercarriage thereof. These airflow segments $F_{S1}$, $F_{S2}$ and $F_{S3}$ eventually rejoin in a wake area or recirculating airflow region $F_{WA}$ immediately behind the vehicle's rear end $S_{RE}$.

Automobile 10 is retrofit or stock equipped with one or more active aero devices, an example of which is shown in FIG. 1 as a rotatable spoiler assembly 20 with a selectively modifiable pitch angle. The selective fore and aft pitch of the active spoiler assembly 20 relative to a transverse vehicle axis $A_{LA}$ is automated via a vehicle controller 30, which may be resident to or remote from the body 12 of the vehicle 10. This active spoiler assembly 20 includes a wing-shaped main body 22 terminating at opposing ends thereof with fin ends (or "fins") 24A and 24B. As used herein, the term "wing-shaped" may be defined as a structure having an airfoil shape that produces an aerodynamic force, such as lift or downforce, during propulsion through a fluid. The spoiler's main body 22 and fins 24A, 24B cooperatively regulate the movement of ambient airflow along the longitudinal axis $A_{LO}$ of the vehicle body 12 aft of the passenger compartment 14. In FIG. 1, the spoiler assembly 20 is a pedestal or "wing" type spoiler architecture, e.g., employing a stanchion assembly (not visible in the view provided) for mounting the spoiler's main body 22 to the vehicle's body 12. The wing-shaped body 22 and fins 24A, 24B may be formed from a suitably rigid but low mass material, such as an engineered plastic, fiber-reinforced glass composite, or aluminum, e.g., for structural stability and resiliency. While shown equipped with a single active aero device 20, which is configured as a rear pedestal spoiler with modifiable pitch angle, it is envisioned that the vehicle 10 may be equipped with additional or alternative active aero devices, which may be similar to or distinct from the representative example shown in the drawings.

For the illustrated architecture, a fore-aft pitch angle of the rotatable spoiler assembly 20 can be adjusted relative to the vehicle body 12 via an electronically controlled, fluid-driven actuator 18. Fluid pressure within this actuator 18 is modulated via the vehicle controller 30, e.g., through command signal control of a fluid pump, bleed valve, etc., to vary the orientation of the active aero device 20. Rotating the spoiler assembly 20 about the transverse vehicle axis $A_{LA}$ acts to modify movement of ambient airflow $F_{OA}$ relative to the vehicle body 12 and thereby vary downforces generated by the airflow on the vehicle 10. In automotive applications, a "downforce" may be typified as a vertical component of an aerodynamic force acting on a moving vehicle to press it downward toward the road surface, e.g., counteracting lift on the vehicle body at elevated road speeds. Hydraulic and pneumatic actuators convert pressurized liquids (pumped oil) or gases (compressed air), respectively, into linear, rotatory or oscillatory motion. In an example, the electrically controlled fluid-driven actuator 18 may include a fluid-tight cylinder mounted to the vehicle body 12, and a piston mechanically coupled at one end to the spoiler's main body 22 and dividing the cylinder into two chambers. A control valve connects the cylinder to a hydraulic or pneumatic circuit, which may require a sump volume for hydraulic applications. A two-way pump is driven in rotation by an electric motor, with a switching device that allows connection ports of one or both chambers to be connected either to the control valve or the pump. In this manner, fluid pressure within one or both chambers of the cylinder is selectively increased and decreased to effectuate linear motion of the piston, which in turn causes movement of the spoiler assembly.

While shown as an adjustable-angle rear spoiler assembly, the active aero device 20 may take on various forms, including that of an adjustable-position spoiler, an adjustable-position splitter, an adjustable-position air dam, an adjustable-position diffuser, an adjustable ride-height suspension, deployable flaps, and/or a variable-position hood shutter having moveable louvers that can be shifted between opened and closed positions. As such, the active aero device 20 can be positioned on the front end $S_{FE}$ or the rear end $S_{RE}$ of the vehicle 10, or at any logically applicable location therebetween. Moreover, the hydraulic/pneumatic actor 18 may be embodied as a fluid-driven linear actuator, a fluid-driven rotary actuator, a single-acting or dual-acting actuator, a ram or diaphragm actuator, a single actuator, or a series of collaborative actuators, or any combination thereof.

As indicated above, electronic vehicle controller 30 is constructed and programmed to govern, among other things, the movement of the active aero spoiler assembly 20 to selectively modify the aerodynamic characteristics of the motor vehicle 10. Control module, module, controller, control unit, electronic control unit, processor, and any permutations thereof may be defined to mean any one or various combinations of one or more of logic circuits, Application Specific Integrated Circuit(s) (ASIC), electronic circuit(s), central processing unit(s) (e.g., microprocessor(s)), and associated memory and storage (e.g., read only, programmable read only, random access, hard drive, tangible, etc.)), whether resident, remote or a combination of both, executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms may be defined to mean any controller executable instruction sets including calibrations and look-up tables. The ECU may be designed with a set of control routines executed to provide the desired functions. Control routines are executed, such as by a central processing unit, and are operable to monitor inputs from sensing devices and other networked control modules, and execute control and diagnostic routines to control operation of devices and actuators. Routines may be executed at in real-time, continuously, systematically, sporadically and/or at regular intervals, for example, each 100 microseconds, 3.125, 6.25, 12.5, 25 and 100 milliseconds, etc., during ongoing vehicle use or operation. Alternatively, routines may be executed in response to occurrence of an event.

With continuing reference to FIG. 1, the vehicle 10 employs one or more prime movers, such as an internal combustion engine (ICE) assembly 40, to transmit tractive power, e.g., through a multi-speed power transmission and drivetrain, to multiple road wheels 32. An array of wheel sensors 34 arranged at various locations throughout the vehicle body 12 operate to detect respective rotating speeds for each of the road wheels 32, and communicate signals indicative thereof to the vehicle controller 30. Once received, the vehicle controller 30 may be programmed to process, analyze and store sensor data, e.g., in resident memory device 28, including correlating wheel speed data of sensor(s) 34 to road speed of the vehicle 10. The vehicle 10 is also equipped with one or more vehicle dynamics sensors 36, each of which may be in the nature of a single-axis or a triple-axis accelerometer, an angular rate sensor, an inclinometer, etc., for detecting yaw, pitch, roll, forward acceleration/deceleration, lateral acceleration/deceleration or any other dynamics related information of the vehicle 10 relative to the road surface, and communicate signals indicative thereof to the controller 30. In FIG. 1, the dashed arrows interconnecting the various illustrated components are emblematic of electronic signals or other communication exchanges by which data and/or control commands are transmitted, wired or wirelessly, from one component to the other. In addition, while shown as a constituent part of the vehicle controller 30 (e.g., embodied as main or auxiliary memory), memory device 28 of FIG. 1 may be a discrete integrated circuit (IC) device that is separately mounted to vehicle body 12, or may be remote from the vehicle 10 and accessible, e.g., via wireless communication over a distributed computer network.

It is envisioned that the vehicle 10 utilize additional or alternative sensors, packaged at similar or alternative locations, to help execute any of the disclosed operations. For instance, the representative vehicle 10 of FIG. 1 is also equipped with one or more airflow sensors 38 designed to detect the velocity of the ambient airflow $F_{OA}$ relative to the vehicle 10, and communicate the detected airflow velocity to the vehicle controller 30. Airflow sensor(s) 38 may take on various designs, such as a pitot tube configured to detect the pressure of the ambient airflow $F_{OA}$ at a specific location relative to the vehicle body 12; the controller 30 may execute instructions to correlate the measured pressure to airflow velocity. In addition to the previously described sensing devices, the vehicle 10 is further equipped with one or more pressure sensors 42 mounted to the vehicle body 12 and directly or indirectly coupled to the fluid-driven actuator 18. This pressure sensor 42 is operable to detect operating fluid pressures within the fluid-driven actuator 18 and generate fluid pressure signals indicative thereof. The pressure sensor 42 may be embodied as any available pressure sensing device, including pressure transducers, capacitive pressure sensors, strain-gauge pressure sensors, piezometers, manometers, bourdon and aneroid sensors, and the like. Optionally, one or more of the aforementioned sensors may be in the form of rotational position sensors, linear position sensors, ultrasonic sensors, laser sensors, and smart-material-based sensors, etc.

Figure 2:
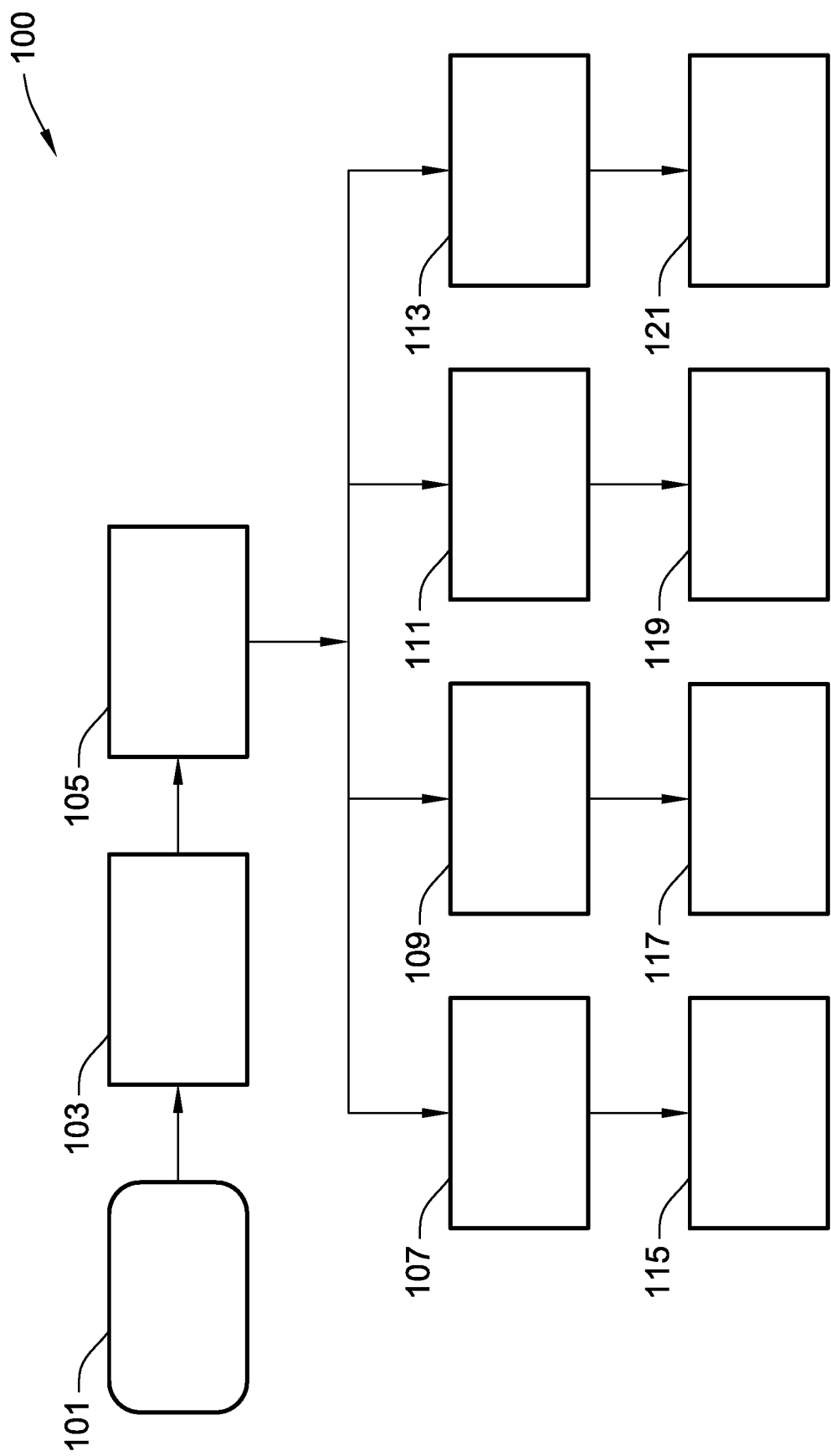
FIG. 2 is a flowchart of a representative algorithm or method for operating an active aero device through hydraulic system downforce feedback that may correspond to instructions executed by onboard control-logic circuitry, programmable electronic control unit, or other computer-based device of a motor vehicle in accord with aspects of the disclosed concepts.

With reference now to the flow chart of FIG. 2, an improved method or control strategy for operating an active aerodynamic device of a motor vehicle, such as rotatable spoiler assembly 20 of automobile 10 in FIG. 1, through closed-loop downforce feedback from a hydraulic or pneumatic vehicle system, such as fluid-driven actuator 18, is generally described at 100 in accordance with aspects of the present disclosure. Some or all of the operations illustrated in FIG. 2 and described in further detail below may be representative of an algorithm that corresponds to processor-executable instructions that may be stored, for example, in main or auxiliary or remote memory, and executed, for example, by an on-board or remote ECU, central processing unit (CPU), control logic circuit, or other module or device, to perform any or all of the above and/or below described functions associated with the disclosed concepts. It should also be recognized that the order of execution of the illustrated operation blocks may be changed, additional blocks may be added, and/or some of the blocks described may be modified, combined, or eliminated.

Method 100 begins at terminal block 101 with the vehicle 10 calling up an initialization procedure for a protocol to establish whether or not an aerodynamic force is being applied to a specific section of the vehicle and, at the same time, generating a downforce on the vehicle. As will be explained in further detail hereinbelow, the forces applied to an active aerodynamic element is determined, at least in part, through feedback from pressure changes in a fluid-driven vehicle system, such as a hydraulically or pneumatically operated rear wing or spoiler. For many existing vehicle platforms, aerodynamic loads are calculated without any system feedback; such feedback, however, enables the system to assess if the active aero device is damaged or operating improperly, and to determine if aerodynamic forces have been altered by external influencers, such as large crosswinds, significant temperature differentials, wind angle, road traffic, etc. The closed-loop feedback system and attendant control logic provides downforce information, including the ability to determine if forces are higher on one side of the active element than another, without requiring dedicated downforce sensors or other costly additions to the vehicle. Terminal block 101 may, thus, be initiated continuously, systematically, arbitrarily, and/or responsively, e.g., upon initiation of a sharp vehicle turn, a sizeable acceleration, or other designated vehicle maneuver.

Upon initialization of the downforce feedback protocol, the vehicle will systematically, sporadically, continuously, and/or responsively detect pressure changes within the fluid-driven vehicle system under analysis. Method 100 of FIG. 2, for example, proceeds to process block 103 with processor-executable instructions for a vehicle controller to receive one or more fluid pressure signals from each of one or more pressure sensors in the aforementioned fluid-driven vehicle system. According to the architecture presented in FIG. 1, for instance, the downforce feedback system may utilize a single pressure sensor 42 for measuring supply-side resistance in the fluid pressure for a single fluid-driven actuator 18. Alternative system architectures may employ multiple pneumatic/hydraulic actuators that cooperatively move a discrete active aero device, where each actuator is operatively connected to a single or multiple pressure sensors for monitoring pressure in that actuator. In this instance, the vehicle controller will receive and analyze multiple fluid pressure signals from multiple pressure sensors indicative of fluid pressures in numerous fluid-driven actuators. In this regard, the vehicle controller 30 may automatically receive electronic signals transmitted in real-time from a pressure sensor or may prompt the monitoring of pressure changes and concomitant transmission of signals indicative thereof.

With continuing reference to FIG. 2, the method 100 proceeds to process block 105 and calculates a current ("actual") downforce value on the active aero device from the electronic signal or signals received from one or more pressure sensor(s). Prior to conducting any such downforce calculation, the vehicle controller may first ascertain if the motor vehicle is operating in any one of a number of calibrated steady-state conditions. Transient operating conditions, such as a meaningful change in vehicle speed within a limited window of time, are susceptible to incidental factors that may skew measurements, which could return a distorted or imprecise calculation. One example of a calibrated vehicle steady-state condition includes a designated dynamic vehicle state in which the vehicle is traversing a generally flat road surface at a substantially constant speed for a calibrated minimum period of time, and aerodynamic forces are detectable without excessive signal noise. Any of the vehicle "calibrated" values, states, conditions, etc., that are discussed herein may be developed for a specific vehicle platform—often specified by vehicle make, model, year, body, trim, etc.—employing on-vehicle testing on test roads, on-vehicle testing in a wind tunnel, and physics-based analytical techniques.

Calculating an "actual" downforce value at block 105—rather than estimating downforce based on tangential vehicle parameters or retrieving a hard-coded theoretical downforce value—may be accomplished with a variety of different approaches. By way of example, vehicle controller 30 of FIG. 1 may receive, look up, or access (collectively "retrieve") from memory device 28 a fluid pressure value calibrated for the in-use actuator or actuators 18 to move the active aero device 20 to a desired deployed state (i.e., a target position, orientation, or other state). Vehicle controller 30 then calculates an absolute value of the mathematical difference between the calibrated fluid pressure value and a fluid pressure value corresponding to the received fluid pressure signal(s). A proportional gain is then applied to this determined difference to compute the actual downforce value. Proportional gain is a tuning parameter, or constant, for a given system, which may be a function of a calibrated mechanical advantage (or disadvantage, depending on system configuration) of the pneumatic/hydraulic actuator. For downforce feedback architectures with multiple actuators and, thus, multiple pressure sensors, the calculated actual downforce value may be a mathematical average of several downforce values, each of which is calculated from one or more pressure signals received from one or more corresponding pressure sensors.

Rather than compute actual downforce during movement of the active aero device, as indicated in the previous example, an actual downforce value may be calculated while the active aero device is maintained substantially stationary. With reference once again to the representative architecture of FIG. 1, the vehicle controller 30 may retrieve from memory device 28 a requisite fluid pressure value calibrated for the in-use actuator or actuators 18 to maintain the active aero device 20 in a desired deployed state. For instance, the fluid-driven actuator 18 may generally require 400 psi to maintain the rotatable spoiler assembly 20 in a 20-degree forward-pitched state during steady-state vehicle operating conditions. The vehicle controller 20 will determine an absolute value of the mathematical difference between this calibrated fluid pressure value and a fluid pressure value corresponding to the pressure signal(s) received from sensor 42. If the pressure sensor is reading 440 psi in pressure in the actuator, the 40 psi difference is indicative of downforce on the active aero device 20. Similar to the example presented above, the controller will then apply a proportional gain to the determined difference to calculate a value for the actual downforce.

Once a current ("actual") downforce value has been calculated, method 100 provides processor-executable instructions at process blocks 107, 109, 111 and 113 for a vehicle controller to determine if the calculated actual downforce value differs from a calibrated downforce value retrieved from mapped vehicle downforce data stored in a memory device. One representative manner of generating the aforementioned mapped vehicle downforce data includes sweeping the vehicle through a standardized "full" range of vehicle ride heights and vehicle pitch angles in a wind tunnel at a progression of wind speeds. The resultant data may be composed of a minimum of four maps per test point, where each map consists of the lift coefficients at a full range of ride heights and pitch angles with the active aero element(s) held static in a single operating position. In some specific cases, there are approximately 10-15 test points, each with full maps of lift coefficients at various ride heights. A vehicle controller may then determine a predicted level of downforce the vehicle should be experiencing at a specific steady-state condition by first looking at the respective position of each active aero element. In so doing, only two to four of the data maps need be utilized (e.g., depending on method used), namely those that are deemed "closest" to the absolute points recorded. The algorithm subsequently compares the coefficients of lift in the maps closest to the element position feedback at the ride heights the vehicle is reporting, and interpolates between them to identify a calibrated value. If a vehicle is sitting idle on a flat surface, it may be assumed that there is no active aero deployment and, commensurately, no measurable aerodynamic downforces. In this case, if a sensor is transmitting reading values that are higher or lower than a set zero value or calibrated datum value relative to the data maps, the system records the difference or percent difference to establish proof of a potential drift error.

Ascertaining if a calculated actual downforce value differs from a calibrated downforce value may require, for at least some applications, determining if the calculated value differs from the calibrated value by at least a hard-coded calibrated minimum discrepancy error percentage or other predetermined maximum tolerance that is calibrated to the steady-state condition in which the motor vehicle is operating. By way of example, vehicle controller 30 of FIG. 1 may receive, look up, or otherwise retrieve a minimum discrepancy error percentage/value from the mapped vehicle downforce data that is stored in memory device 28. This mapped data may be embodied as a series of aerodynamic characteristic maps, each of which corresponds to a respective vehicle operating state and includes expected downforce values correlated to respective vehicle speeds when the motor vehicle is operating under the respective vehicle operating condition. The subject vehicle may be evaluated in a wind tunnel to experimentally derive each aerodynamic characteristic map. The wind tunnel simulates the movement of air around the vehicle under controlled wind speeds, temperatures, and other conditions to determine magnitudes of forces acting upon the vehicle with the vehicle controlled under various operating parameters. Such operating parameters may include front and rear vehicle ride height, pitch, roll, heading angle, air velocity, vehicle velocity, and position(s) of one or more aerodynamic devices, such as front air dams, rear spoilers, etc. Within this mapped data there may be included a single "system level" minimum discrepancy error (i.e., one that is implemented for all determinations in blocks 107-113) or a series of operating-condition specific minimum discrepancy errors (e.g., a corresponding minimum discrepancy error is selected for the current system operating state).

According to the illustrated example of FIG. 2, process block 107 includes executable instructions for determining if an actual downforce value, as discussed above, is greater than a calibrated downforce value (e.g., by at least a calibrated minimum discrepancy error percentage or value). In the same vein, process block 109 includes executable instructions for determining if the calculated actual downforce value is equal to or approximately equal to a corresponding calibrated downforce value. Furthermore, process block 111 includes executable instructions for determining if an actual downforce value is less than a calibrated downforce value (e.g., by at least a calibrated minimum discrepancy error), while process block 113 includes executable instructions for determining if the calculated actual downforce value is oscillating outside a calibrated oscillation tolerance range for a given active aero device (e.g., indicating a possible hazard has or will occur). While shown as four separate process blocks, it should be appreciated that two or more or all of blocks 107-113 may be combined into a single decision block or a set of interoperable decision blocks.

The determinations made at process blocks 107-113 of the algorithm 100 may be used by an in-vehicle or off-board controller, electronic control unit (ECU), discrete or collaborative group of control modules, etc., to trim or otherwise modulate any relevant vehicle system to help optimize vehicle dynamic performance. For instance, vehicle controller 30 of FIG. 1 may automatically respond to a determination that a calculated actual downforce is greater than a mapped/anticipated downforce value (process block 107=YES) by identifying, at process block 115, a target active aero device position that corresponds to the smaller target mapped/anticipated downforce value for a current operating condition of the vehicle. Conversely, the vehicle controller 30 of FIG. 1 may determine that a calculated actual downforce is less than a mapped/anticipated downforce (process block 111=YES) and automatically respond by identifying, at process block 119, a target active aero device position that corresponds to the larger target mapped/anticipated downforce value. Within either of these automated responses, the vehicle controller 30 transmits one or more compatible command signals to the pneumatic/hydraulic actuator 18 to move the active aero device 20 to the desired target position and, thus, help to achieve target downforce. In at least some applications, the foregoing target orientation, state, and/or location (collectively "target position") for the active aero device may be selected from a look-up table with calibrated target positions for a series of different target downforce values, which may be stored in memory device 28. Other relevant vehicle systems, including active ride-height, active steering, other active aero elements, may concurrently respond to help offset any difference between actual and target downforce.

A target position of an active aero device may be determined in real-time based, at least in part, on subsequent pressure signal feedback received from the vehicle's pressure sensor(s) while the in-use actuator or actuators are actively moving the active aerodynamic device. By way of non-limiting example, after confirming that the actual downforce being experienced by the vehicle 10 is larger/smaller than anticipated, at block 107 or 111, vehicle controller 30 of FIG. 1 responsively coordinates operation of the fluid-driven actuator 18 to progressively rotate active aero spoiler assembly 20, e.g., clockwise/counterclockwise, and thereby shed or amplify downforce. The actuator 18 would cease operation when a new calculated downforce value, e.g., measured through the hydraulic system as stated above, is within a predetermined range of a stored mapped downforce value for a given operating condition. However, if the intent is to minimize downforce, the actuator 18 would slowly rotate the spoiler assembly 20 and shed downforce until a minimum calculated value is achieved; the actuator 18 would then cease operation.

During target positioning set forth in process blocks 115 and 119, system analysis may show that a target downforce value cannot be achieved—there is no target position available to realize a target downforce through controller modulation of an active aero device. In such an instance, the vehicle controller 30 of FIG. 1 may responsively judge an error size and/or location, which may be stored in memory device 28 for future reference and potential system degradation analysis. Concomitantly, the controller 30 will call up and enter calibrated active aero control logic to maintain a steady-state operating conditions of the motor vehicle, e.g., that will support safety and regulation requirements. Likewise, if the actual downforce value is oscillating outside a calibrated oscillation tolerance range (process block 113=YES), the vehicle controller will call up and enter control logic to maintain similar steady-state operating conditions at process block 121. If, however, method 100 of FIG. 2 determines that the calculated downforce value does not significantly differ from the calibrated downforce value (process block 109=YES), active aero device state may be left unchanged, and the vehicle controller 30 may enter a state of system healthy code into the memory device 28 at block 117.

Aspects of this disclosure may be implemented, in some embodiments, through a computer-executable program of instructions, such as program modules, generally referred to as software applications or application programs executed by an on-board vehicle computer. The software may include, in non-limiting examples, routines, programs, objects, components, and data structures that perform particular tasks or implement particular abstract data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore, be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, or method disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in other manners (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for operating an active aerodynamic device of a motor vehicle, the motor vehicle including a vehicle body with the active aerodynamic device movably mounted on the vehicle body, and a pneumatic or hydraulic actuator selectively operable to move the active aerodynamic device, the method comprising:
    detecting, via a pressure sensor mounted to the vehicle body and fluidly connected to the pneumatic or hydraulic actuator, a fluid pressure in the pneumatic or hydraulic actuator;
    receiving, from the pressure sensor via a vehicle controller communicatively connected thereto, a fluid pressure signal indicative of the detected fluid pressure;
    calculating, via the vehicle controller, an actual downforce value from the received fluid pressure signal, wherein calculating the actual downforce value includes:
        determining a calibrated fluid pressure value for the pneumatic or hydraulic actuator to move the active aerodynamic device to or maintain the active aerodynamic device in a select deployed state;
        determining a difference between the calibrated fluid pressure value and a fluid pressure value corresponding to the received fluid pressure signal; and
        applying a gain to the determined difference to calculate the actual downforce value;
    retrieving, from a memory device via the vehicle controller, a calibrated downforce value stored in mapped vehicle downforce data calibrated to the motor vehicle;
    determining, via the vehicle controller, if the calculated actual downforce value differs from the retrieved calibrated downforce value;
    responsive to a determination that the actual downforce value differs from the calibrated downforce value, determining a target position for the active aerodynamic device corresponding to a target downforce value for a current operating condition of the vehicle; and
    transmitting a command signal to the pneumatic or hydraulic actuator to move the active aerodynamic device to the target position.

2. The method of claim 1, wherein the determining if the calculated actual downforce value differs from the calibrated downforce value includes determining if the calculated actual downforce value differs from the calibrated downforce value by at least a calibrated minimum discrepancy error.

3. The method of claim 2, further comprising:
    determining if the target downforce value cannot be achieved; and
    responsive to a determination that the target downforce value cannot be achieved, judging an error size and/or location and entering active aero control logic to maintain a steady state operating condition of the motor vehicle.

4. The method of claim 1, further comprising:
    determining if the calculated actual downforce value is oscillating outside a calibrated oscillation tolerance range for the active aerodynamic device; and
    responsive to a determination that the actual downforce value is oscillating outside the calibrated oscillation tolerance range, entering active aero control logic to maintain a steady state operating condition of the motor vehicle.

5. The method of claim 1, wherein the target position is determined in real-time based, at least in part, on subsequent fluid pressure signals received from the pressure sensor while the pneumatic or hydraulic actuator is actively moving the active aerodynamic device.

6. The method of claim 1, wherein the mapped vehicle downforce data includes a series of aerodynamic characteristic maps, each of the aerodynamic characteristic maps corresponding to a respective vehicle operating state and including a plurality of expected downforce values each correlated to a respective one of a plurality of vehicle speeds when the motor vehicle is operating under the respective vehicle operating state.

7. The method of claim 1, further comprising, responsive to a determination that the actual downforce value does not differ from the calibrated downforce value, entering a state of system healthy code into the memory device.

8. A method for operating an active aerodynamic device of a motor vehicle, the motor vehicle including a vehicle body with the active aerodynamic device movably mounted on the vehicle body, and a pneumatic or hydraulic actuator selectively operable to move the active aerodynamic device, the method comprising:
  detecting, via a pressure sensor mounted to the vehicle body and fluidly connected to the pneumatic or hydraulic actuator, a fluid pressure in the pneumatic or hydraulic actuator;
  receiving, from the pressure sensor via a vehicle controller communicatively connected thereto, a fluid pressure signal indicative of the detected fluid pressure;
  calculating, via the vehicle controller, an actual downforce value from the received fluid pressure signal;
  retrieving, from a memory device via the vehicle controller, a calibrated downforce value stored in mapped vehicle downforce data calibrated to the motor vehicle;
  determining, via the vehicle controller, if the calculated actual downforce value differs from the retrieved calibrated downforce value;
  responsive to a determination that the actual downforce value differs from the calibrated downforce value, determining a target position for the active aerodynamic device corresponding to a target downforce value for a current operating condition of the vehicle;
  transmitting a command signal to the pneumatic or hydraulic actuator to move the active aerodynamic device to the target position;
  determining if the target downforce value cannot be achieved; and
  responsive to a determination that the target downforce value cannot be achieved, entering active aero control logic to maintain a steady state operating condition of the motor vehicle.

9. The method of claim 8, wherein calculating the actual downforce value includes:
  determining a calibrated fluid pressure value for the pneumatic or hydraulic actuator to move the active aerodynamic device to or maintain the active aerodynamic device in a select deployed state;
  determining a difference between the calibrated fluid pressure value and a fluid pressure value corresponding to the received fluid pressure signal; and
  applying a gain to the determined difference to calculate the actual downforce value.

10. The method of claim 8, wherein the determining if the calculated actual downforce value differs from the calibrated downforce value includes determining if the calculated actual downforce value differs from the calibrated downforce value by at least a calibrated minimum discrepancy error.

11. The method of claim 8, further comprising:
  determining if the calculated actual downforce value is oscillating outside a calibrated oscillation tolerance range for the active aerodynamic device; and
  responsive to a determination that the actual downforce value is oscillating outside the calibrated oscillation tolerance range, entering active aero control logic to maintain a steady state operating condition of the motor vehicle.

12. The method of claim 8, wherein the target position is determined in real-time based, at least in part, on subsequent fluid pressure signals received from the pressure sensor while the pneumatic or hydraulic actuator is actively moving the active aerodynamic device.

13. The method of claim 8, wherein the mapped vehicle downforce data includes a series of aerodynamic characteristic maps, each of the aerodynamic characteristic maps corresponding to a respective vehicle operating state and including a plurality of expected downforce values each correlated to a respective one of a plurality of vehicle speeds when the motor vehicle is operating under the respective vehicle operating state.

14. The method of claim 8, further comprising, responsive to a determination that the actual downforce value does not differ from the calibrated downforce value, entering a state of system healthy code into the memory device.

15. A method for operating an active aerodynamic device of a motor vehicle, the motor vehicle including a vehicle body with the active aerodynamic device movably mounted on the vehicle body, and a pneumatic or hydraulic actuator selectively operable to move the active aerodynamic device, the method comprising:
  detecting, via a pressure sensor mounted to the vehicle body and fluidly connected to the pneumatic or hydraulic actuator, a fluid pressure in the pneumatic or hydraulic actuator;
  receiving, from the pressure sensor via a vehicle controller communicatively connected thereto, a fluid pressure signal indicative of the detected fluid pressure;
  calculating, via the vehicle controller, an actual downforce value from the received fluid pressure signal;
  retrieving, from a memory device via the vehicle controller, a calibrated downforce value stored in mapped vehicle downforce data calibrated to the motor vehicle;
  determining, via the vehicle controller, if the calculated actual downforce value differs from the retrieved calibrated downforce value;
  responsive to a determination that the actual downforce value differs from the calibrated downforce value, determining a target position for the active aerodynamic device corresponding to a target downforce value for a current operating condition of the vehicle;
  transmitting a command signal to the pneumatic or hydraulic actuator to move the active aerodynamic device to the target position;
  determining if the calculated actual downforce value is oscillating outside a calibrated oscillation tolerance range for the active aerodynamic device; and
  responsive to a determination that the actual downforce value is oscillating outside the calibrated oscillation tolerance range, entering active aero control logic to maintain a steady state operating condition of the motor vehicle.

16. The method of claim 15, wherein the determining if the calculated actual downforce value differs from the calibrated downforce value includes determining if the calculated actual downforce value differs from the calibrated downforce value by at least a calibrated minimum discrepancy error.

17. The method of claim 15, wherein calculating the actual downforce value includes:
   determining a calibrated fluid pressure value for the pneumatic or hydraulic actuator to move the active aerodynamic device to or maintain the active aerodynamic device in a select deployed state;
   determining a difference between the calibrated fluid pressure value and a fluid pressure value corresponding to the received fluid pressure signal; and
   applying a gain to the determined difference to calculate the actual downforce value.

18. The method of claim 15, further comprising:
   determining if the target downforce value cannot be achieved; and
   responsive to a determination that the target downforce value cannot be achieved, entering active aero control logic to maintain a steady state operating condition of the motor vehicle.

19. The method of claim 15, wherein the target position is determined in real-time based, at least in part, on subsequent fluid pressure signals received from the pressure sensor while the pneumatic or hydraulic actuator is actively moving the active aerodynamic device.

20. The method of claim 15, wherein the mapped vehicle downforce data includes a series of aerodynamic characteristic maps, each of the aerodynamic characteristic maps corresponding to a respective vehicle operating state and including a plurality of expected downforce values each correlated to a respective one of a plurality of vehicle speeds when the motor vehicle is operating under the respective vehicle operating state.

* * * * *